United States Patent [19]

Sidyakin et al.

[11] 4,052,585

[45] Oct. 4, 1977

[54] BUTT WELDING PROCESS AND APPARATUS FOR EFFECTING SAME

[76] Inventors: Vitaly Alexandrovich Sidyakin, ulitsa Fabritsiusa, 44, korpus 2, kv. 126; Alexandr Nikolaevich Sabantsev, ulitsa Bagritskogo, 3, korpus 1, kv. 70; Evgeny Mikhailovich Lapin, Davydkovskaya ulitsa, 38, kv. 57; Evgeny Alexeevich Machnev, Presnensky val, 7, kv. 2, all of Moscow, U.S.S.R.

[21] Appl. No.: 603,254

[22] Filed: Aug. 11, 1975

[51] Int. Cl.² .............................................. B23K 11/04
[52] U.S. Cl. .................................. 219/100; 219/104; 219/137 R
[58] Field of Search ................... 219/97, 137 R, 104; 1/100

[56] References Cited

U.S. PATENT DOCUMENTS

| 2,286,212 | 6/1942 | Gorn | 219/97 |
|---|---|---|---|
| 2,613,305 | 10/1952 | Clack | 219/97 |
| 2,933,594 | 4/1960 | Johnson | 219/137 R |

Primary Examiner—E. A. Goldberg
Attorney, Agent, or Firm—Lackenbach, Lilling & Siegel

[57] ABSTRACT

Disclosure is made of a butt welding process, whereby butt ends of articles to be welded together are placed one opposite the other in a chamber containing a shielding medium. The butt ends are then heated until a layer of molten metal is formed on their surfaces, and upset in order to effect their plastic deformation and produce a weld joint. According to the invention, the heating and flashing-off of the butt ends are effected by a low-pressure arc uniformly distributed over the entire butt end surfaces of the articles being welded. The proposed method is effected through the use of an apparatus which, apart from a welding transformer whose secondary winding terminals are connected to articles being welded, comprises, in accordance with the invention, an auxiliary transformer that serves to initiate a low-pressure arc, or, successively, a glow discharge and a low-pressure arc between the butt ends of the articles being welded, as well as to stabilize said low-pressure arc, the secondary winding terminals of the auxiliary transformer being connected to the articles being welded via a valve-type breaker intended for controlling the low-pressure arc. The proposed process and apparatus for effecting this process make it possible to weld articles with different cross-sectional configurations, while making use of small deformations of articles in order to produce a weld joint. The process and apparatus of the present invention also account for a stable welding process.

9 Claims, 8 Drawing Figures

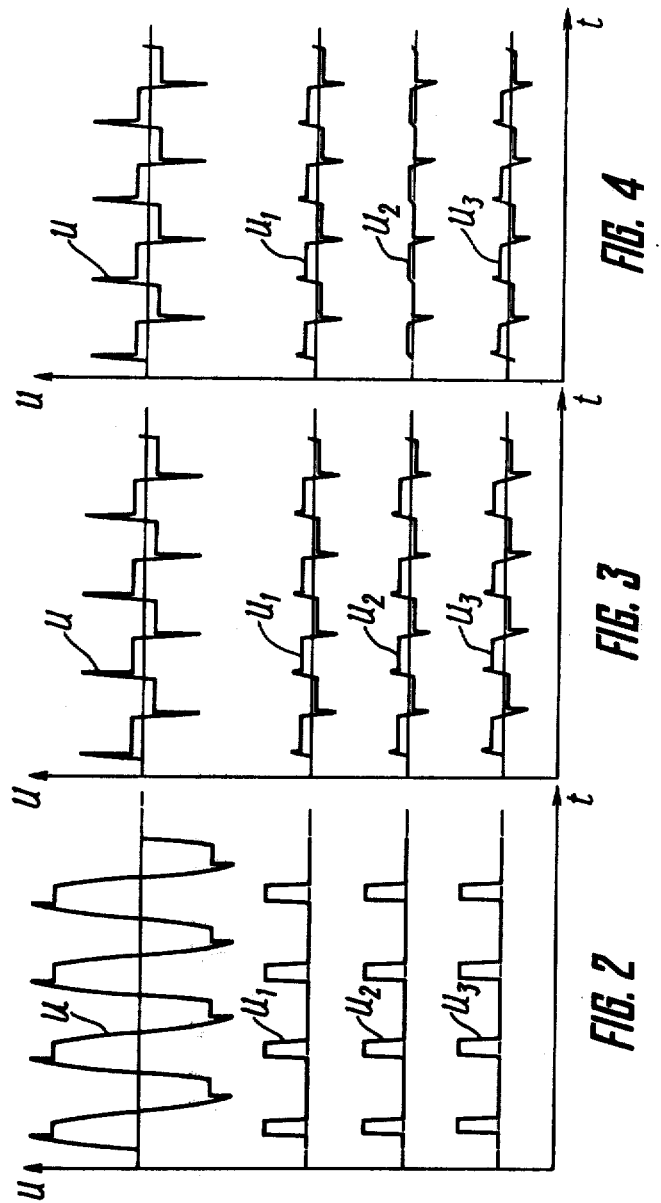

BUTT WELDING PROCESS AND APPARATUS FOR EFFECTING SAME

The present invention relates to butt welding processes and apparatus for effecting such processes.

The invention is applicable in different fields of engineering for butt welding of articles having different cross-sectional configurations and made from different materials and alloys.

The invention is particularly advantageous in building structures from tubular elements of a round, rectangular or any other cross-section, as well as in welding thin-walled profiled articles of any configuration made from aluminum alloys.

According to known butt welding methods, butt ends of articles being welded are placed in spaced relationship one opposite the other in a shielding medium, after which said butt ends are heated to form a layer of molten metal on their surfaces, and are then upset to produce plastic deformation and form a weld joint.

There is widely known a resistance flash-butt welding process, whereby the heating and flashing of the butt ends of articles being welded are effected by passing electric current through said articles. The butt ends of the articles being welded are in contact with each other. In the course of flashing, the articles being welded are slowly brought closer to each other with the welding transformer being switched on. As a rule, on the butt end surfaces of articles being welded there are micropores and microscopic protrusions. As the butt ends of the articles being welded are brought together, microscopic protrusions come into contact with each other. The current density is sufficiently high, so the contact areas are rapidly fused, and liquid metal spacings are produced between the butt ends. Due to continued heating, these spacings are destroyed in an explosion-like manner, whereby on the butt ends of the articles being welded there are produced craters coated with molten metal which cools and crystallizes. The formation of such craters badly impairs the butt end reliefs. As the articles being welded are continuously brought together, molten metal spacings are repeatedly produced and destroyed at all points of the butt end surfaces. As a result, the portions of the articles being welded that adjoin their butt ends are heated, and a layer of molten metal gradually builds up on the butt end surfaces.

At any specific moment of time, the butt ends are heated only at contact areas, so the temperature distribution over the butt end surfaces is very uneven. For this reason, it is extremely difficult to obtain an uninterrupted layer of molten metal, especially when welding articles from highly heat-conducting materials. The non-uniform heating of the butt ends and impaired surface reliefs thereof necessitate great deformations of said articles in order to produce a weld joint. This, in turn, leads to the formation of large amounts of fin.

There is further known a butt welding process with the use of an arc rotating in a magnetic field. According to this method, butt ends of articles to be welded are placed one opposite the other in a chamber containing a shielding medium, after which the butt ends are heated to form a molten metal layer on their surfaces, and upset to bring about their plastic deformation and form a weld joint. According to the method under review, the heating and flashing of the butt ends are caused by an electric arc which is moved along the butt ends being welded under the action of a transverse magnetic field.

In this case, too, the weld joint is produced by upsetting the articles being welded. The butt ends of articles being welded are placed in a transverse magnetic field, and an arc is struck which interacts with the magnetic field and starts moving at a high speed. The movement of the arc is continuous and sufficiently uniform only between the butt ends which make up a closed loop, i.e., in pipe welding. Butt ends of pipes to be welded are placed one opposite another in spaced relationship, provided that the spacing width is constant. Magnetizing coils are fitted over the pipes close to their butt ends. The magnetomotive forces of said magnetizing coils act in opposite directions. The interaction of the magnetic fields of th coils produces a radial magnetic flux in the spacing between the pipes. The electric arc is struck between the butt ends of the pipes and starts rapidly rotating, under the action of the magnetic field, along the periphery of the butt, ends of the pipes at a speed of several tens of meters per second. As a result, the butt ends of the pipes are soon heated and flashed off. If an alternating-current arc is used, this arc is stabilized by initiating a short pulse at the moment when the arc polarity is changed. Upon switching off the current, the butt ends of the articles being welded are upset to produce a weld joint.

At any specific moment of time, the butt ends of articles being welded are heated only at the arcing areas, so the temperature distribution over the butt ends is non-uniform. This necessitates great deformations of the articles, which, in turn, accounts for large quantities of fin.

The method under discussion has a number of disadvantages. For example, it is difficult to control the welding process by using this method. The heat distribution over the butt ends of articles being welded is uneven. Finally, and what is the most important, the method confines itself only to producing structrures from tubular elements of a round cross-section.

There is known a flash-butt welding apparatus for effecting the known method, which comprises a chamber wherein there are installed clamps for articles to be welded. One of said clamps is adapted for linear movement along the geometrical axis of articles being welded as these are being upset following the flashing-off process. The apparatus further includes a welding transformer whose secondary winding terminals are connected to the articles being welded.

This known apparatus also includes a bed whereupon there are mounted a stationary plate and a movable plate. On each said plate there is mounted a clamp for an article being welded. The movable plate is coupled to an upset mechanism. The chamber communicates with degassing means. The chamber is composite and consists of two portions with a damping gasket therebetween. Installed in the chamber are current contact tips which extend outside the chamber through sealed holes and are connected to the welding transformer. When articles to be welded are installed in the chamber, the inlets are sealed off by gaskets. If pipes are to be welded, their ends outside the chamber are also sealed.

There is known a rotating arc welding apparatus, wherein the electric arc rotates in a magnetic field. In this apparatus, the welding transformer is connected to articles being welded either directly or via the windings of coils mounted on both pipes that are to be welded. The welding transformer serves to supply current to an alternating-current arc and produce a transverse magnetic field in order to make the arc moving.

The welded joint is produced by upsetting the articles being welded. This is accompanied by substantial deformation of the articles' portions that adjoin their butt ends and, consequently, the formation of great amounts of fin. The removal of fin, particularly from inside the articles, requires special devices, which considerably complicates the apparatus' design.

It is an object of the present invention to provide a but welding process which would make it possible to weld articles having different cross-sectional configurations, by using small, as compared to conventional butt welding techniques, deformations of articles in order to produce welding joints.

It is another object of the invention to provide an apparatus for effecting the aforesaid method, which would ensure a stable welding process and would be simple to manufacture and reliable in operation.

The foregoing and other objects of the present invention are attained by providing a butt welding process, whereby butt ends of articles to be welded are placed one opposite the other in a chamber containing a shielding medium, after which the butt ends are heated to produce a molten metal layer on their surfaces, and upset to cause their plastic deformation and form a weld joint, in which process the heating and flashing off of the butt ends are effected, in accordance with the invention, by a low-pressure arc uniformly distributed over the entire butt end surfaces of the articles being welded.

The foregoing method for heating the butt ends of articles being welded makes it possible to uniformly heat them in order to produce a thin and uniformly distributed layer of molten metal. The proposed method also ensures a good relief of butt end surfaces, which makes it possible to use relatively small deformations for the formation of weld joints.

Uniform distribution of the low-pressure arc over the entire butt end surfaces of articles being welded is to be ensured by properly selecting the pressure inside the chamber, depending upon the type of shielding medium, the metal from which the articles being welded are made, and the welding current density.

Whenever it is necessary to uniformly heat the butt end surfaces of articles being welded, or to weld metals that produce refractory oxide films, it is expedient that use should be made of a low-pressure arc. It is expedient, for example, that articles from aluminum alloys should be welded by a low-pressure, alternating-current arc in an argon medium, at a pressure from 1 to 10 mm of mercury, and a current density of up to 150 A/cm$^2$.

A low-pressure, alternating-current arc is marked by a low stability, hence, it is necessary that said arc should be stabilized throughout the arcing time with the aid of an auxiliary arc initiated by means of a glow discharge at the beginning of each half-wave of the low-pressure arc current.

In order to ensure uniform distribution of the low-pressure arc, it is expedient that the butt ends of articles being welded should be heated, prior to their flashing, by a glow discharge therebetween.

The preliminary heating of the butts ends by the glow discharge helps to destroy the oxide film and remove other impurities from the butt end surfaces, for the presence of impurities and oxide films on the butt end surfaces impairs the uniformity of the low-pressure arc distribution and may cause the arc to counteract.

The proposed butt welding method is effected with the aid of a butt welding apparatus comprising a chamber wherein there are installed clamps for articles to be welded, one of said clamps being adapted for linear movement along the geometrical axis of the articles being welded as these are being upset following the flashing-off of their butt ends, said apparatus further including a welding transformer whose secondary winding terminals are connected to the articles being welded, in which apparatus there is, according to the invention, an auxiliary transformer that serves to strike and stabilize between the butt ends of the articles being welded a low-pressure arc or, successively, a glow discharge and a low-pressure arc, and to stabilize said low-pressure arc, the secondary winding terminals of said auxiliary transformer being connected to the articles being welded, whereas the welding transformer is connected to the articles being welded via a valve-type breaker to control the low-pressure arc.

The foregoing manner of connecting the welding transformer to the articles being welded, and the introduction of the auxiliary transformer makes it possible to heat the butt ends of the articles being welded by the glow discharge, and to stabilize the low-pressure, alternating-current arc.

Other objects and advantages of the present invention will become more apparent from the following detailed description of a preferred embodiment thereof taken in conjunction with the accompanying drawings, wherein:

FIG. 2 shows oscillograms of voltages between the pipes amd across the probes in the course of the burning of a glow discharge that covers the entire butt end surfaces of the pipes;

FIG. 3 shows oscillograms of voltages between the pipes and across the probes for the case of uniform distribution of a low-pressure arc over the butt end surfaces of the pipes;

FIG. 4 shows oscillograms of voltages between the pipes and across the probes for the case of non-uniform distribution of the low-pressure arc over the butt end surfaces of the pipes;

Figure 1:
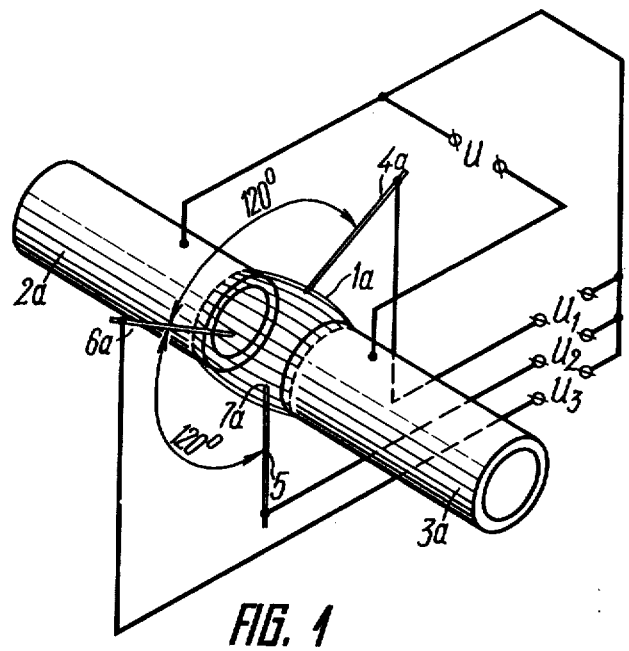
FIG. 1 is a diagram of probing the positive electric discharge column between pipes being welded.

Referring now to the attached drawings, disclosure is made herein of a butt welding process, whereby butt ends of articles to be welded are placed one opposite the other in a chamber containing a shielding medium, after which the butt ends are heated until a molten metal layer is formed on their surfaces, and upset to bring about their plastic deformation and produce a weld joint.

According to the invention, the heating and flashing-off of the butt ends are effected by a low-pressure arc uniformly distributed over the entire butt end surfaces of the articles being welded.

The low-pressure arc is known to be substantially different from the conventional welding arc, i.e., the high-pressure arc. The basic difference between the two lies in that the positive column plasma of the low pressure arc is non-isothermal The temperature of electrons in that column is greater by far than that of gas atoms.

The above-mentioned factor accounts for great electronic heat conductivity in the positive column of the low-pressure arc, whereby the electron temperature is made uniform over the cross-sectional area of the positive column. This results in a sufficiently uniform distribution of current density across the positive column.

As the gas pressure increases, the electron temperature is reduced due to a decrease in the free path length of electrons and an increase in the number of stepwise ionization events. Meanwhile, the temperature of gas atoms is growing due to an increase in the frequency of their collisions with electrons. As a result, the non-isothermal positive column turns into a counteracting and almost isothermal column. The range of pressures at which the foregoing change in the arc is brought about depends upon the nature of the gas and the current density and lies between 1 and 100 mm of mercury.

The low-pressure arc further differs from the high-pressure arc in the nature of processes that take place in the cathode area. On a low-pressure arc cathode, there are normally several cathode spots which move radiply and chaotically over the cathode surface, being mutually repelled by one another. An increase in the current intensity causes an increase in the nunber of cathode spots, as well as an increase in the cathode area covered by the arc discharge.

The authors of the present invention have established that at a certain shielding gas pressure, which depends upon the nature of the shielding gas and the metal from which the articles being welded are manufactured, as well as upon the current intensity, the low-pressure arc, like a glow discharge, can uniformly envelop the entire cathode surface, i.e., the entire butt end surfaces of the articles being welded.

Due to the fact that the anode and cathode are heated to different degrees, the but welding process of the present invention makes use of a low-pressure, alternating-current arc. The periodic polarity wall on the articles being welded ensures uniform heating of both articles and also destroys oxide films in the course of cathode sputtering at the butt ends of the articles.

The uniform arc distribution has been corroborated by the uniform flashing-off of the butt ends of articles being welded and by the results of discharge probing.

FIG. 1 shows a diagram of probing a positive column $1a$ between two pipes $2a$ and $3a$ of an aluminum alloy. Three probes $4a$, $5a$ and $6a$ are placed in the spacing between the butt ends of the pipes, in the plane perpendicular to the pipes' axis. Ends $7a$ of the probes are arranged along a circumference having a diameter $d$ equal to the outer diameter of the pipes, and spaced from one another at a distance equal to $\tau d/3$.

In the course of probing, there are taken oscillographic measurements of voltage U between the pipes $2a$ and $3a$, and voltages $U_1$, $U_2$ and $U_3$ across the probes $4a$, $5a$ and $6a$, respectively, relative to the pipe $2a$. If a glow discharge is initiated between the pipes $2a$ and $3a$, which glow discharge is uniformly distributed over the entire butt ends of the pipes, the voltages across all the probes are equal (FIG. 2). The situation is similar in the case of a low-pressure arc uniformly distributed over the butt end surfaces of the pipes (FIG. 3). However, if the arc distribution is non-uniform, the voltages across the probes are different (FIG. 4).

A reduced gas pressure is invariably conducive to a more uniform distribution of the arc over the butt ends of the articles being welded. Apart from the butt end surfaces, the discharge also covers the inner and outer surfaces of the pipes close to the butt end area.

As the shielding gas pressure is brought down, the low-pressure arc covers increasingly greater portions of the inner and outer surfaces of th pipes. At an argon pressure of less than 2 mm of mercury, the arc envelops the outer surface of the pipes over the entire clamping area which is equal to 4 mm for a pipe having a cross-section of 10 by 1 mm. At pressures below 0.5 .10$^{-}$mm of mercury, the arc also envelops the clamping means.

An excessive decrease in the shielding gas pressure, when the arc envelops a substantial portion of the outer and inner surfaces of the articles being welded, sharply reduces the effectiveness of heating the butt ends of the articles. On the contrary, an excessive increase in the shielding gas pressure causes the arc discharge to counteract.

In the case of welding aluminum alloy tubes in an argon medium, the pressure range is between 5 and 8 mm of mercury.

If the current intensity is too low, the arc discharge covers only a portion of the butt end surfaces of the pipes. An increase in the current intensity is conducive to a more uniform distribution of the low-pressure arc of the butt end surfaces of the pipes, yet an excessive current intensity also makes the discharge counteract.

The gap width between the butt ends of articles being welded is also an essential factor as regards the stability of the process. An excessive narrowing of the gap increases the probability of arc counteraction, whereas an excessive widening of the gap affects the arc initiation conditions and reduces the thermal efficiency of the arc. In the case of welding aluminum alloy tubes having a diameter of 10 mm and a wall thickness of 1 mm, the optimum gap is 3 mm.

After the butt ends of the articles being welded have been flashed off, the articles are upset to effect plastic deformation of their butt ends and produce a weld joint.

The arc discharge distributed over the butt end surfaces of the articles being welded ensures the formation of an uninterrupted film of molten metal. This, in turn, produces an ideal microrelief of the butt end surfaces prior to upsetting. This perfect microrelief and the presence of an uninterrupted layer of molten metal on the butt end surfaces make it possible to produce a high-quality weld joint with a small deformation of the butt ends. The latter factor accounts for a small amount of fin produced in the course of the welding process. Thus, the proposed butt welding process is essentially characterized in that the heating and flashing-off of the butt ends of articles being welded are effected by a low-pressure arc, the shielding gas pressure and current intensity being selected so as to ensure uniform distribution of the arc over the entire butt end surfaces of the articles being welded.

The welding conditions in welding aluminum alloy tubes having a diameter of 10 mm and a wall thickness of 1 mm are as follows: argon pressure, 7 mm of mercury; current intensity, 120 A; heating time, 0.26 sec; upset distance, 1 mm.

The stability of the heating process and the probability of arc counteraction are largely dependent upon the condition of the butt end surfaces of articles being welded. Oxide films and other impurities affect the stability of the process and may cause counteraction of the low-pressure arc. In order to raise the stability of the process and improve the uniformity of the low-pressure arc distribution over the butt end surfaces of articles being welded, it is advisable that prior to flashing-off the butt ends by the low-pressure arc, the butt end surfaces should be subjected to the action of a glow discharge initiated therebetween. At a certain current intensity, the glow discharge covers th entire butt end surfaces of pipes being welded, whereby oxide films and other impurities are removed. In welding aluminum alloy pipes having a diameter of 10 mm and a wall thickness of 1 mm, this operation is carried out for 10 sec at a current intensity of 0.3 A.

Continuous decomposition, division and movement of cathode spots in a low-pressure arc are indicative of an instability of cathode spots. This factor considerably reduces the stability of a low-pressure arc. As the polarity is changed in an alternating-current arc, the resultant brief cutting-off of current may interrupt the arc discharge. In order to ensure a stable low-pressure, alternating-current arc, it is expedient that use should be made of special increased-frequency power sources or power sources having a square waveform of supply voltage. If commercial-frequency welding sources are used, spacial measures must be taken to stabilize the low-pressure arc.

According to the proposed butt welding method, the low-pressure arc is fed from a conventional commercial-frequency welding transformer, whereas the stabilization of the arc is done by initiating an auxiliary arc at the beginning of each current half-wave. The latter is done by an auxiliary source connected in parallel with the main source and having an increased open-circuit voltage.

Described hereinbelow, by way of an exemplary embodiment of the invention, is a flash-butt welding apparatus intended for welding end fittings to pipelines. The apparatus is equally advantageous in welding an end member, for example, a channel-beam, and its fixture to a long article of practically any cross-sectional shape.

Figure 5:
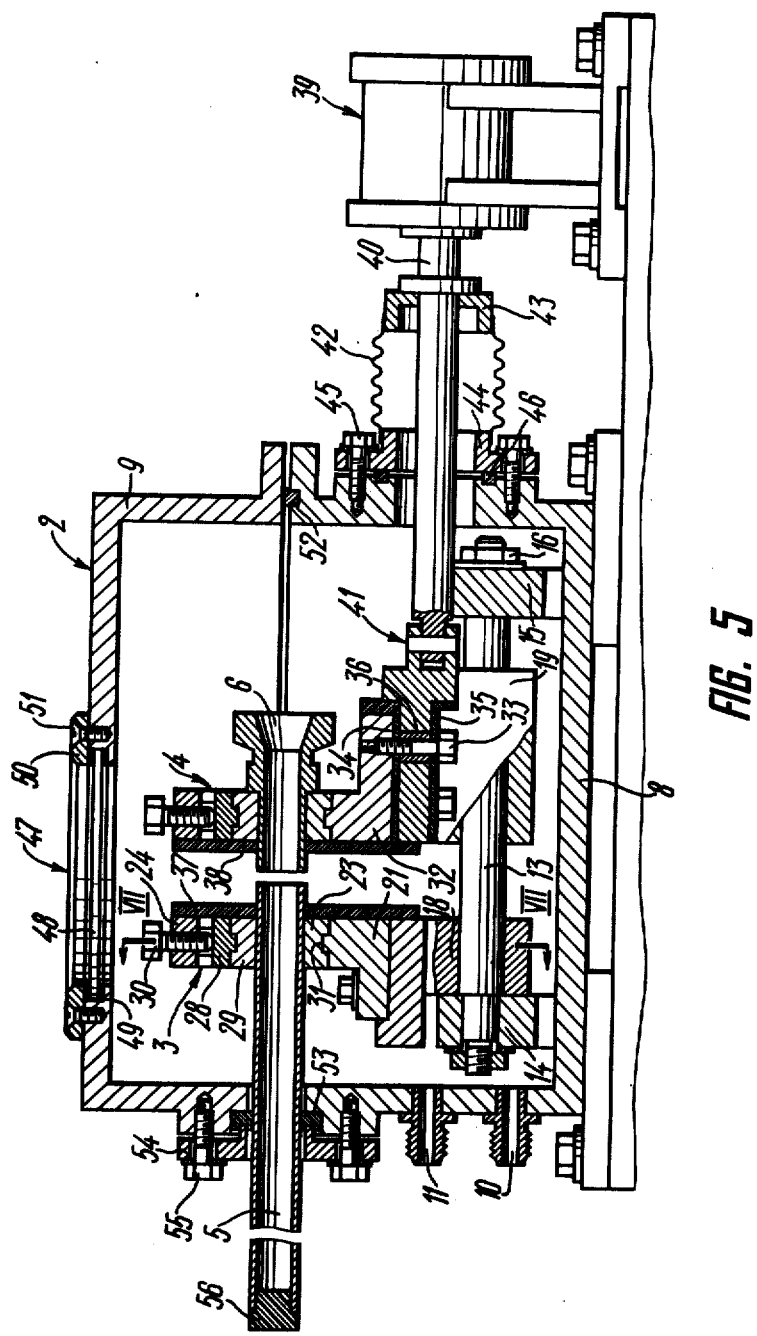
FIG. 5 is a general elevation view of an apparatus according to the invention, intended for welding pipeline elements by using the proposed butt welding method.
Figure 6:
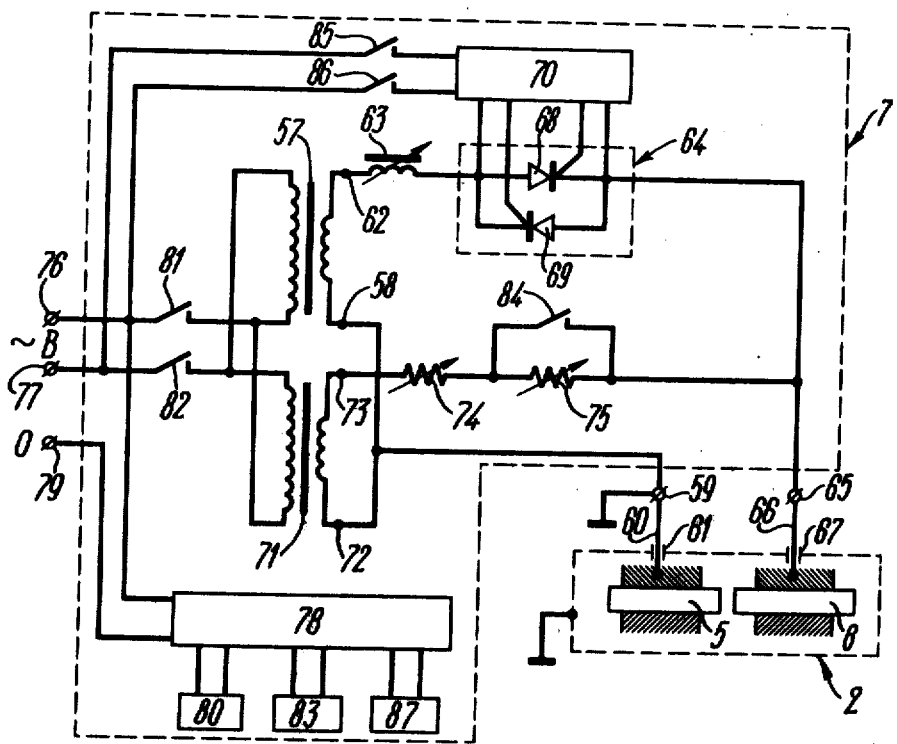
FIG. 6 is preferred embodiment of a power source of the apparatus according to the invention, represented partially as a block diagram and partially as a key diagram.

The apparatus of the present invention has a base 1 (FIG. 5) whereupon there is mounted a vacuum chamber 2. Installed in the chamber 2 are clamps 3 and 4 for articles 5 and 6 being welded. The right-hand (see the drawing) clamp 4 is adapted for reciprocating metion along the geometrical axis of the articles 5 and 6 to be welded which are arranged coaxially in relation to each other. The apparatus further comprises a welding source 7 (FIG. 6) connected to the articles 5 and 6. The vacuum chamber 2 is split in the horizontal plane along the axis of the articles 5 and 6 and is composed of a housing 8 and a lid 9. The housing 8 is a box-type structure. The thickness and rigidity of its walls must be sufficient to withstand stresses that appear in the course of operation. The left-hand (see the drawing) vertical wall of the housing 8 is provided with holes to receive sleeves 10 and 11. The sleeve 10 serves to connect the chamber 2 to a degassing system, whereas the sleeve 11 is meant for the supply of a shielding gas, for example, argon, to said chamber 2.

Figure 7:
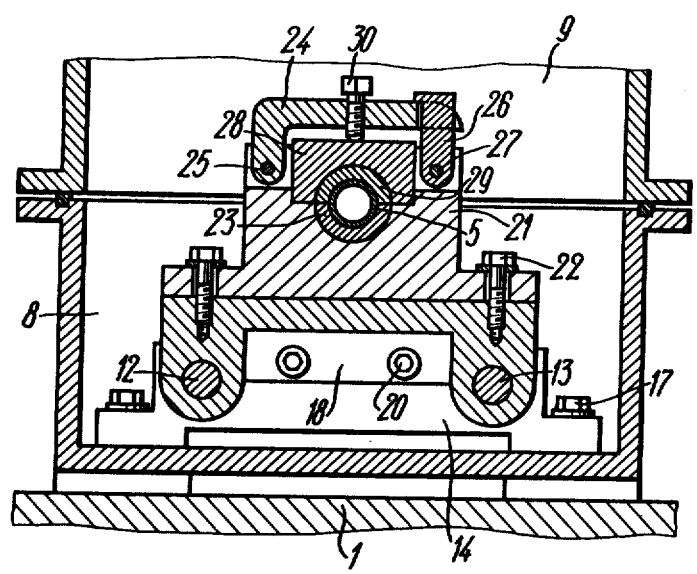
FIG. 7 is a cross-sectional view of the apparatus in accordance with the invention, intended for butt welding of pipeline elements by using the proposed method.

Arranged in the housing 8, parallel to each other and in one horizontal plane, are guides 12 (FIG. 7) abd 13. The ends of said guides 12 and 13 are secured in cross-pieces 14 and 15 (FIG. 5) by nuts 16. The cross-pieces 14 and 15 are secured by bolts 17 (FIG.7) in the housing 8 of the vacuum chamber 2.

The clamps 3 and 4 are mounted on plates 18 and 19, respectively. Mounted on the guides 12 and 13 is the stationary plate 18 which is mounted by the clamp 3 and attached to the cross-piece 14 by bolts 20. The plate 19 is movably mounted on the guides 12 and 13. For this purpose, provision is made for through holes in said plate 19.

The clamp 3 has a base 21 secured on the plate 18 by bolts 22. On the upper (see the drawing) horizontal surface of the base 21 there is a semicircular recess to receive an insert 23. Mounted on the base 21 is a clamping device comprising a profiled strip 24 hingedly coupled by one of its ends to the base 21 by means of an axle 25. At its other end, said strip 24 has a groove to receive a latch 26 which is also hingedly coupled to the base 21 by means of an axle 27. The clamping device further includes a strap 28 inserted between the strip 24 and the upper horizontal plane of the base 21. On the lower (see the drawing) surface of the strap 28 there is also a semicircular recess to receive an insert 29. The inserts 23 and 29 face one the other with surfaces whose profiles corresponds to the cross-sectional shape of the article 5 to be welded.

Thus, the clamp 3 serves to hold the article 5 being welded. In order to clamp the article 5 between the inserts 23 and 29, the clamping device is provided with a bolt 30 received in a threaded hole in the strip 24.

To prevent axial movement of the inserts 23 and 29 relative to the base 21 and the strap 28 in the course of upsetting the articles 5 and 6 being welded, an annular projection 31 (FIG. 5) is provided on the bottom of the recesses that receive the inserts 23 and 29.

The right-hand (see the drawing) clamp 4 has a base 32 secured on the plate 19 by bolts 33. The base 32 and, consequently, the clamp 4 and the article 6 being welded are electrically insulated from the plate 19 by a gasket 34 inserted between the lower horizontal surface of the base 32 and the upper horizontal surface of the plate 19, as well as by a gasket 35 inserted under the heads of the bolts 33, and bushes 36 received in the holes made in the plate 19 and intended for the bolts 33.

Mounte on the base 32 is a clamping device meant to secure the article 6 being welded coaxially with the article 5 being welded. The design of this clamping device is similar to that of the device mounted on the base 21 and intended to secure the article 5 being welded.

On the surfaces of the clamps 3 and 4, that face one another, there are mounted insulating strips 37 and 38, respectively, each being split horizontally and in one place with the geometrical axis of the articles 5 and 6 being welded.

To effect reciprocating motion of the clamp 4 in the course of operation, provision is made for a drive which is a power cylinder 39 mounted on the base 1. A rod 40 of the cylinder 39 is parallel to the axis of the articles 5 and 6 being welded and is coupled to the plate 19, whereupon the clamp 4 is mounted, by means of a cylindrical hinge 41 whose rotation axle is arranged vertically. The place where the rod 40 extends into the vacuum chamber 2 is sealed by a sylphon 42. A bottom 43 of said sylphon 42 has an opening for the rod 40 and is welded to the latter. A flange 44 is welded to the sylphon 42 on the left (see the drawing) side thereof, which flange 44 is secured to the housing 8 by bolts 45 and through a seal 46.

For visual inspection of the welding process, in the lid 9 there is made a window 47 with a glass plate 48. Said window 47 is sealed by means of seals 49 arranged on both sides of the glass plate 48, and a ring 50 secured to the lid 9 by screws 51.

The place where the housing 8 and the lid 9 of the vacuum chamber 2 are joined together is sealed by a seal 52.

If at least one of the articles being welded is of a considerable length, only a relatively small portion of that article is received in the chamber 2. The place where the article 5 extends outside the chamber 2 is sealed by a sealing ring 53 received in recesses provided on the outside of the left (see the drawing) wall of the chamber 2. The sealing ring 53 envelops the article 5 and is secured in place by a split flange 54 and bolts 55.

In cases of welding hollow structures of a considerable length, for example, a pipeline, the outlet opening of the article, which is outside the chamber 2, is sealed by a plug 56.

In the apparatus of the present invention, the welding source 7 (FIG. 6) is supplied with alternating current having a frequency of 50 Hz. The source 7 includes a welding transformer 57 whose secondary winding terminal 58 (in the present case, this terminal is the beginning of the secondary winding of the transformer 57) is connected to a terminal 59. The terminal 59 is coupled through a cable 60 to the stationary clamp 3 and, consequently, to the article 5 being welded. In order to connect the cable 60 to the clamp 3, in the wall of the chamber 2 there is made an opening to receive a vacuum connector 61. The terminal 59 of the power source 7 and, consequently, the article 5 being welded are grounded. The vacuum chamber 2 is also grounded.

A terminal 62 of the secondary winding of the welding transformer 7 (in the present case, this terminal is the end of the secondary winding of the transformer 7) is connected, via an adjustable reactor 63, which serves to control the welding current intensity, and a valve-type breaker 64, to a terminal 65 of the power source 7. The terminal 65 is connected by a cable 66 to the movable clamp 4 and, consequently, to the article 6 being welded. In order to connect the cable 66 to the clamp 4, in the wall of the chamber 2 there is made another opening to receive a vacuum connector 67.

The breaker 64 comprises two controlled valves 68 and 69 connected in parallel opposition. In order to control operation of the valve 68 and 69, in the power source 7 provision is made for a control pulse former 70.

According to the invention, the power source 7 has an auxiliary transformer 71. A terminal 72 of the secondary winding of said auxiliary transformer 71 (in the present case, this terminal is the beginning of the secondary winding of the transformer 71) is connected to the terminal 58 of the secondary winding of the welding transformer 57 and, consequently, to the article 5 being welded. A terminal 73 of the secondary wibding of the auxiliary transformer 71 (in the present case, this terminal is the end of the secondary winding of the transformer 71) is connected via rheostats 74 and 75, which are placed in series, to the terminal 65 of the power source 7 and, consequently, to the article 6 being welded.

The primary windings of the welding transformer 57 and the auxiliary transformer 71 are place in parallel and connected to terminals 76 and 77 of the power source 7, whereto there is applied line supply voltage which is conventionally designated as ~ B.

The power source 7 further has a programming unit 78 which comprises three electronic time relays placed in parallel. The programming unit 78 is connected to therminals 76 and 79, whereto phase supply voltage is applied.

Connected to one of the time relays of the programming unit 78 is a magnetic starter 80 which is meant to connect, via its terminals 81 and 82, the primary windings of the transformers 57 and 71 to the terminals 76 and 77 where to supply voltage is applied. Connected to another time relay of the programming unit 78 is an electromagnetic contactor 83 which is meant to shunt, with the aid of its contact 84, the rheostat 75 and connect, via contacts 85 and 86, the pulse former 70 to the terminals 76 and 77 of the power source 7. Connected to the third time relay of the programming unit 78 is a winding of a solenoid-operated valve 87 which serves to supply a medium into the power cylinder 39 in the course of upsetting the articles being welded.

The proposed apparatus operates as follows.

The rod 40 of the power cylinder 39 and consequently, the clamp 4, are moved to the extreme right position. The lid 9 of the vacuum chamber 2 is removed, and the articles 5 and 6 are secured in the clamps 3 and 4, respectively.

The article 5 is installed in place in the following order.

The latch 26 is unlocked by being turned around its axle 27. The profiled strip 24 is turned around the axle 25, and the strap 28 and insert 29 are removed. The pipe 5 is then placed on the insert 23, and the insert 29 and strap 28 are put in place. The profiled strip 24 is turned about its axle 25 and placed above the strap 28. The latch 26 is turned around the axle 27 and received in the groove of the profiled strip 24. The pipe is then secured by the bolt 30.

The article (sleeve) 6 is installed and secured in the clamp 4 in a similar manner.

As the articles 5 and 6 are being secured in the clamps 3 and 4, one must ensure a required gap between their butt ends, which is done, for example, with the aid of a calibrated strip inserted between said butt ends.

After the articles to be welded have been secured, the lid 9 is closed and firmly pressed against the housing 8 of the vacuum chamber 2 with the aid of catches (not shown). The seal 52 is compressed, thereby sealing the vacuum chamber 2 where the housing 8 and lid 9 are joined together.

The place where the pipe 5 extends outside the chamber 2 is to be sealed. For this purpose, a sealing ring 53 is fitted over the pipe 5, and the split flange 54 is installed in place and pressed against the chamber 2 by bolts 55. The sealing ring 53 is compressed and seals the chamber 2. After this, the opening of the pipe 5, which is outside the chamber 2, is sealed by the plug 56.

The chamber 2 being sealed, it is connected to the degassing system. After the pressure in the chamber has been reduced to $10^{-2}$ mm of mercury, the degassing system is disconnected, and the chamber is filled with an insert gas (argon) whose pressure amounts to 6 + 8 mm of mercury. At this stage, the preparation for the welding process is over.

The welding is carried out as follows. The programming unit 78 is brought into play and supplies voltage to the winding of the magnetic starter 80. The magnetic starter 80 is actuated, and its contacts 81 and 82 are closed. As a result, the primary windings of the welding transformer 57 and the auxiliary transformer 71 are connected to the power mains, so across the secondary windings of these transformers there appears sinusoidal alternating voltage (the curves 1 and 2 in FIG. 8).

The primary windings of the transformers 57 and 71 are connected so that voltage across their secondary windings are in phase.

The open-circuit voltage of the welding transformer 57 is 60 to 70V. The open-circuit voltage of the auxiliary transformer 71 is selected to be sufficient to initiate a glow discharge between the butt ends of the articles 5 and 6 being welded. The magnitude of this voltage is selected depending upon the nature and pressure of the shielding gas and the width of the gap between the butt ends of the articles 5 and 6. In the case being discussed, this voltage amounts to 300 V.

In the initial state of the circuitry, the contacts 85 and 86, are open, the control pulse former 70 is out of operation, and the valve-type breaker 64 is out of conduction.

Voltage from the secondary winding of the auxiliary transformer 71 is applied to the articles 5 and 6 installed in the chamber, and a glow discharge is initiated between the butt ends of said articles 5 and 6 being welded. The voltage across the articles being welded (during the action of the glow discharge) is represented by the curve 3 in FIG. 8.

The glow discharge current is selected so that the glow discharge covers the entire butt end surfaces of the articles being welded. This current is controlled by the variable resistor 75 as the apparatus is adjusted for the welding operation.

After a certain period of time specified for subjecting the butt ends of the articles being welded to the action of the glow discharge, the programming unit 78 applies voltage to the winding of the electromagnetic contactor 83.

The contactor 83 is actuated, and its contacts 84, 85 and 86 are closed.

The bridging of the contacts 85 and 86 puts into action the control pulse former 70 which generates electric pulses (see FIG. 8, the curves 5 and 6) which are applied to the control electrodes of the valves 68 and 69.

However, the fact that control pulses are sent to the valves 68 and 69 cannot actuate the valve-type breaker 64, since the glow discharge voltage is in excess of the open-circuit voltage of the welding transformer 57.

Figure 8:
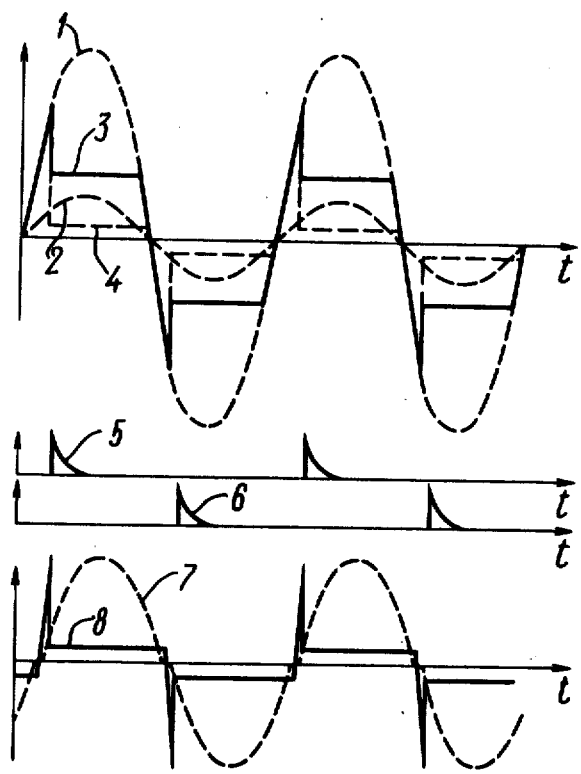
FIG. 8 shows oscillograms that explain operation of the power source of the apparatus.

In order to reduce the voltage across the articles being welded and put the valve-type breaker 64 into operation, the contact 84 is closed simultaneously with the closing of the contacts 85 and 86. As the contact 84 is closed, it shunts the resistor 75. This results in a sharp increase in the current intensity of the glow discharge, and the glow discharge is changed into a low-pressure arc, its current being limited by the resistor 74. As the arc is struck, the voltage across the articles being welded in rapidly brought down so that it becomes lesser than the no-load voltage of the welding transformer 57. The curve 4 of FIG. 8 represents a change in the voltage during the low-pressure arcing process from the auxiliary transformer 71, with the valve-type breaker 64 being disconnected.

In the case under review, the current intensity of the low-pressure arc is 20 A.

The sharp decrease in the voltage across the articles being welded, brought about by the closing of the contact 84, makes it possible to bring into operation the valve-type breaker 64. During a positive alternating voltage half-wave across the secondary winding of the welding transformer 57, right after the auxiliary arc has been struck, a control pulse is applied from the former 70 to the control electrode of the valve 68. The valve 68 is driven into conduction, and the arc current sharply increases, as the welding transformer 57 is brought into action. During a negative alternating voltage half-wave across the secondary winding of the welding transformer 57, the valve 69 is brought into action in a similar way.

The magnitude of the welding current is controlled by the reactor 63, as the apparatus is adjusted for the welding operation.

Due to the valve-type breaker 64, at the end of each half-wave of the welding current the secondary winding of the welding transformer 57 is disconnected from the articles being welded, and high voltage is applied to these from the secondary winding of the auxiliary transformer 71.

This initiates a glow discharge between the articles being welded, which is automatically changed into a low-pressure arc. Then the valve-type breaker 64 is brought into action, and the main arc is struck, i.e the arc initiated by the welding transformer 57.

Thus, there is ensured stable excitation of the process as the welding current polarity is changed. The curves 7 and 8 of FIG. 8 represents the welding current and the low-pressure arc voltage, respectively.

After a certain period of time during which the low-pressure arc heats the butt ends of the articles being welded and forms a layer of molten metal thereon, the programming unit 78 applies voltage to the winding of the solenoid-operated valve 87. The solenoid-operated valve 87 is actuated, and working fluid is supplied to the power cylinder 39.

As a result, the rod 40 is moved to the left, which brings about the bridging of the gap between the butt ends of the articles being welded and joint plastic deformation of said butt ends, whereby a weld joint is produced.

Shortly after the start of the upset operation during which the butt ends of the articles being welded are brought together and their plastic deformation takes place, the programming unit 78 removes voltage from the winding of the magnetic starter 80. As a result, the contacts 81 and 82 are opened, and voltage is removed from the articles being welded. Voltage is also removed from the windings of the contactor 83 and valve 87; the contacts 84, 85 and 86 are opened, and the circuitry resumes its initial state.

The welding process being over, the vacuum chamber 2 is unsealed, the lid 9 removed, the clamps 3 and 4 unclamped, and the welded articles removed.

What is claimed is:

1. A butt welding process comprising the steps of:
   a. positioning the butt ends or portions of the articles to be welded in proximate spaced relation to each other;
   b. placing said butt ends in a shielding medium at a predetermined low pressure;
   c. firstly heating the butt ends by a glow discharge initiated in the gap therebetween;
   d. secondly heating the butt ends by a low-pressure arc uniformly distributed over the entire butt end surfaces of the articles being welded until a molten layer is formed thereon; and
   e. upsetting the articles to be welded to cause their plastic deformation and produce a weld joint.

2. A process as defined in claim 1, wherein said predetermined low pressure is selected to correspond to the shielding medium, the material from which the articles to be welded are manufactured, and the welding current density.

3. A process as defined in claim 1, wherein said low-pressure arc is maintained by an alternating or sinusoidal current, and wherein said first heating step comprises the step of stabilizing the low-pressure arc throughout each entire cycle thereof by initiating an auxiliary arc at the beginning of each half-wave of the low-pressure arc current.

4. A process as defined in claim 1, wherein the secondary windins of a welding transformer and an auxiliary transformer are connected in parallel across the articles to be welded, impedance means being interposed in series between said auxiliary transformer secondary winding and the articles, and switching means are interposed in series between said welding transformer and the articles, and wherein said first heating step is achieved by adjusting said resistance means and applying a relatively high voltage across the articles to be welded by said auxiliary transformer secondary winding.

5. A process as defined in claim 4, wherein said second heating step is achieved by decreasing said impedance means to increase the current flowing through the articles, and actuating said switching means to apply a relatively low voltage and high current through the articles by said welding transformer secondary winding.

6. A process as defined in claim 5, further comprising the step of adjusting the magnitude of the welding current flowing through the articles when connected across the secondary of said welding transformer.

7. A process as defined in claim 1, further comprising the step of timing the duration of each of said heating and upsetting steps and sequencing the initiation of each of these steps successively following predetermined time intervals.

8. A process as claimed in claim 9, whereby articles from aluminum alloys are welded in argon at a pressure of 1 to 10 mm of mercury and a current density of up to 150 A/cm$^2$.

9. A butt welding process comprising the steps of:
  a. positioning the butt ends or portions of the articles to be welded in proximate space relation to each other;
  b. placing said butt ends in a shielding medium at a predetermined low pressure;
  c. heating the butt ends by a low-pressure arc uniformly distributed over the entire butt end surfaces of the articles being welded until a molten layer is formed thereon, said low-pressure arc being maintained by an alternating or sinusoidal current;
  d. stabilizing said low-pressure arc throughout each entire cycle thereof by initiating an auxiliary arc at the beginning of each half-wave of said low-pressure arc current; and
  e. upsetting the articles to be welded to cause their plastic deformation and produce a weld joint.

* * * * *